United States Patent Office 3,467,705
Patented Sept. 16, 1969

3,467,705
NEUROTROPIC AMIDES FROM N-SUBSTITUTED AMINOMETHYL-NOR-CAMPHANE AND A PROCEDURE FOR THEIR PREPARATION
Pietro Gigante, Demetrio Antoniu, Fabrizio Ganzina, Mario Magi, and Enrico Serino, Rome, Italy, assignors to Sir Laboratori Chimico-Biologici S.p.A., Rome, Italy, a joint-stock company of Italy
No Drawing. Filed Aug. 11, 1965, Ser. No. 479,012
Int. Cl. C07c *103/30;* A61k *27/00*
U.S. Cl. 260—558         6 Claims

ABSTRACT OF THE DISCLOSURE

Amides derived from the 1-4 endomethylene-2-aminomethylcyclohexane having the general structural formula

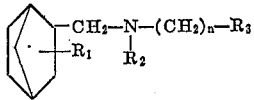

and 5,6 dehydro analogs thereof where
$n = 0, 1, 2, 3, 4, 5$;
$R_1$ = an alkyl, alkenyl, cycloalkyl, aralkyl, aryl, either free or partially substituted by OH, halogens, alkoxy, thioalkyl or amino-groups or heterocyclic groups;
$R_2$ = an acyl
$R_3$ = hydrogen, hydroxyl, oxyacyl, oxyalkyl, isopropyl, dialkylamino- or morpholine-, pyrrolidino-, piperidino- or piperazino-groups, either free or partially substituted by methyl, ethyl, isopropyl, OH.

---

This invention relates to a method for preparing a group of amides derived from 1-4 endomethylene-2-aminomethyl-cyclohexane and to the products obtained by this method.

The structure of 1-4 endomethylene-2-aminomethyl-cyclohexane is the following:

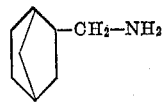

The amides derived, according to this invention, from the nucleus of 1-4 endomethylene-2-aminomethyl-cyclohexane present the following general structural formula:

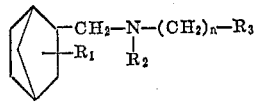

and 5,6 dehydro analogs thereof where
$n = 0, 1, 2, 3, 4, 5.$
$R_1$ = an alkyl, alkenyl, cycloalkyl, aralkyl, aryl, either free or partially substituted by OH, halogens, alkoxy, thioalkyl or amino-groups or heterocyclic groups.
$R_2$ = an acyl.
$R_3$ = hydrogen, hydroxyl, oxyacyl, oxyalkyl, isopropyl, dialkylamino- or morpholino-, pyrrolidino-, piperidino- or piperazino-groups, either free or partially substituted by methyl, ethyl, isopropyl, OH.

Previously these amides have never been described in the literature and they take the form of white crystalline substances or of light yellowish, very viscous oils, which are very difficultly distillable. We have found that they have in common a low toxicity and a high neurotropic action, and therefore they are applicable to the therapeutical field.

As a general rule we found that the amides with low molecular weight acids or aliphatic acids manifest excitant and psychostimulating actions, while with acid, medium molecular weight or aromatic radicals they yield substances which are endowed with excellent sedative, spasmolytic and anesthetic activities.

The extension of the alkylamine chain causes an increase of the sedative and anesthetic activity, while the presence of a dialkylaminoalkyl group enhances in general this activity, although it reduces the tolerability of the product.

The amides according to the structural form of the present invention are prepared by reacting an acylhalide with the primary or secondary amine having the desired substituent.

The substituted amine is obtained by the action, upon the corresponding primary amine, of $R_3(CH_2)_mX$ (where X = halogen and $R_3$ has been previously defined) or of $R_3(H_2)_{n-1}COX$ (where X = halogen and $R_3$ is as previously defined) and a successive reduction with aluminum lithium hydride, or of $R_3(CH_2)_{n-1}CHO$ and a successive catalytic hydrogenation. An example of the reaction scheme is the following:

(a)
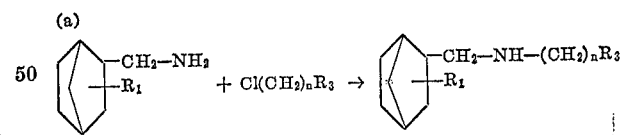

(b)
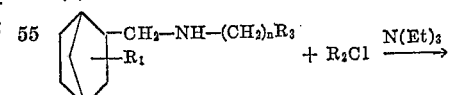

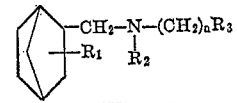

The reaction (a) is carried out by simply heating both reactants for 5–10 hours at 160° C., and excess amine in the proportion of 3 moles of amine for one mole of chloride is used as an hydrochloric acid acceptor.

The crude reaction product is purified by dissolving it in ether, washing it in alkaline water and distilling it under vacuum.

Thus the excess amine is recovered and the pure N-substituted amine is obtained, with a yield of about 90%.

The reaction (b) is effected by slowly adding without heating, 1 mole of acid chloride dissolved in benzole to a benzenic solution containing 1 mole of N-substituted amine and 1 mole triethylamine which serves as an hydrochloric acid acceptor.

Once the addition is terminated, the whole is reflux boiled for 3–7 hours and the reaction mixture is washed with 10% sodium hydroxide, with 10% hydrochloric acid and finally with water.

By vacuum evaporation of the solvent, from the benzene solution an oily, slightly yellowish and difficultly distillable residue is obtained, which is constituted by the desired amide.

The yield is approximately 90%.

Sometimes the amide may be obtained in crystalline form by treating the above residue with a small amount of ethyl acetate or with an ethyl acetate-petroleum ether mixture in the proportion of 4:1. The above described methods are very simple.

The high yields and the low costs of the solvents and reactants used for the purifications render these methods applicable to a simple and economical industrial processing.

In the following we describe some examples illustrating the method and the resulting products of the invention. It is understood that these examples have merely the purpose of showing the process steps and the resulting products, while in no way limiting the scope of the present application.

EXAMPLE 1

11.6 g. of 1–4 endomethylene-2-aminomethyl-3-methylcyclohexane are heated at 160° C. with 2.25 ethylenechlorhydrin for 7 hours.

By alkalization with NaOH 1 N, extraction with ethyl ether and distillation 5 g. of 1–4 endomethylene-2-oxyethylaminomethyl-3-methylcyclohexane (I) are obtained and 4 g. unreacted amine is recovered.

(a) To 20 g. of product (I) and 11.1 g. triethylamine dissolved in 200 ml. anhydrous benzene, 19.2 g. para-chlorobenzoyl chloride dissolved in 50 ml. anhydrous benzene are added while cooling the mixture.

After completing the addition the whole is reflux boiled for 4 hours under agitation and after washing with 10% hydrochloric acid, 10% sodium hydroxide, filtration through Norit carbon and evaporation of the solvent 24 g. of a residue is obtained, consisting of para-chlorobenzamide of 1–4 endomethylene-2-oxyethylaminomethyl-3-methylcyclohexane.

This residue appears as a very viscous, slightly yellowish oil and after a treatment with an ethyl acetate/petroleum ether mixture (4:1) it crystallizes to form white crystals with a melting point of 98° C.

(b) To 10 g. of product (I) and 5.6 g. triethylamine dissolved in 100 ml. anhydrous benzene 7.4 g. levulinoyl chloride dissolved in 25 ml. anhydrous benzene are added while cooling.

After completing the addition the whole is reflux boiled for 5 hours and after washing with 10% hydrochloric acid, 10% sodium hydroxide and filtration through Norit carbon and evaporation of the solvent a slightly yellowish oily residue is obtained, consisting of 11.5 g. of levulinamide of 1–4 endomethylene-2-oxyethylaminomethyl-3-methylcyclohexane.

EXAMPLE 2

(c) To 19.6 g. 1–4 endomethylene-2-oxyethylaminomethyl-3-phenylcyclohexane and 10.1 g. triethylamine dissolved in 200 ml. anhydrous benzene 7.85 g. actylchloride dissolved in 50 ml. anhydrous benzene are added while cooling.

After the addition is completed the whole is reflux boiled for 3 hours and after washing with 10% hydrochloric acid, 10% sodium hydroxide, filtration through Norit carbon and evaporation of the solvent 20 g. of a very viscous and slightly colored oleous residue is obtained, consisting of the acetamide of the 1–4 endomethylene-2-oxyethylaminomethyl-3-phenylcyclohexane.

EXAMPLE 3

To 50 g. of 1–4 endomethylene-2-aminomethyl-3-methylcyclohexane and 36.6 g. triethylamine dissolved in 200 ml. anhydrous benzene 43.5 g. isovaleryl chloride (i.e. isopentanoyl chloride) dissolved in 50 ml. anhydrous benzene are slowly admixed while cooling.

After the admixture is completed the whole is reflux boiled for 5 hours, thereafter the precipitate formed, consisting of triethylamine chlorhydrate is eliminated by filtration.

From the clear benzene solution, after acid and alkaline washings and solvent evaporation an oily residue is obtained, which through vacuum distillation yields 60 g. mono-isovaleramide of the 1–4 endomethylene-2-aminomethyl-3-methylcyclohexane (product II).

27 g. of product II, dissolved in 100 ml. anhydrous ethyl ether are slowly added to a suspension of 9.2 g. aluminum lithium hydride in 300 ml. anhydrous ethyl ether.

After terminating the admixture the whole is reflux boiled for 8 hours, thereafter the excess aluminum lithium hydride is destroyed with water, the ether solution is washed with 10% sodium hydroxide and after evaporation of the solvent the residue is distilled in vacuum, and thereby 21 g. of 2-isoamylaminomethyl-3-methyl-1–4-endomethylene-cyclohexane is obtained, which appears as a rather mobile colorless oil (product III).

To 10 g. of product III and 4.85 g. triethylamine dissolved in 100 ml. anhydrous benzene 6.45 g. levulinoyl chloride dissolved in 25 ml. anhydrous benzene are added while cooling.

After completing the addition the whole is reflux boiled for 5 hours and after washing with 10% sodium hydroxide, 10% hydrochloric acid, filtration through Norit carbon and evaporation of the solvent 11 g. of a slightly yellowish oily residue is obtained, consisting of the levulinamide of 2 - isoamylaminomethyl - 3 - methyl - 1–4 - endomethylene-cyclohexane.

EXAMPLE 4

To 10 g. of 1–4-endomethylen-2-methylaminomethyl-3-methylcyclohexane and 6.6 g. triethylamine dissolved in 100 ml. anhydrous benzene 8.8 g. levulinoyl chloride dissolved in 25 ml. anhydrous benzene are admixed while cooling.

After completing the admixture the whole is reflux boiled for 5 hours and after acid and alkaline washings, filtration through Norit carbon and evaporation of the solvent 11 g. of an oily residue are obtained, consisting of the levulinamide of the 1–4-endomethylen-2-methylaminomethyl-3-methylcyclohexane.

The chemical data which are characteristic of all the compounds quoted in the above described examples are listed in Table 1.

TABLE I
General Formula

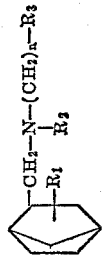

| | Substituents | | | | Molecular weight | Composition | | | | | | | | Boiling point | |
|---|---|---|---|---|---|---|---|---|---|---|---|---|---|---|---|
| | | | | | | Theorical | | | | Found | | | | | |
| n | R₁ | R₂ | R₃ | Raw formula | | C | H | N | Cl | C | H | N | Cl | Temp. in °C. | Vacuum in mm.Hg |
| 0 | CH₃ | H | H | C₉H₁₇N | 139 | 77.69 | 12.23 | 10.07 | | 77.80 | 12.35 | 10.10 | | 60 | 5 |
| 0 | Phenyl | H | H | C₁₄H₁₉N | 201 | 83.58 | 9.46 | 6.96 | | 83.45 | 9.60 | 6.87 | | 110 | 2 |
| 0 | CH₃ | H | OH | C₁₁H₂₁NO | 183 | 72.13 | 11.47 | 7.65 | | 72.25 | 11.35 | 7.80 | | 96 | 1 |
| (*) 2 | CH₃ | —O—C₆H₄—Cl | OH | C₁₈H₃₄ClNO₂ | 321.5 | 67.15 | 7.52 | 4.35 | 11.02 | 67.05 | 7.61 | 4.46 | 11.05 | | |
| (*) 2 | CH₃ | —OC—CH₂—CH₂—CO—CH₃ | OH | C₁₆H₂₇NO₃ | 281 | 68.32 | 9.61 | 4.98 | | 68.30 | 9.65 | 5.02 | | | |
| (*) 2 | Phenyl | H | OH | C₁₆H₂₅NO | 245 | 78.32 | 9.8 | 5.71 | | 78.57 | 9.90 | 5.84 | | 150 | 0.15 |
| 2 | do | —CO—CH₃ | OH | C₁₈H₂₅NO₂ | 287 | 75.26 | 8.71 | 4.88 | | 75.40 | 8.65 | 4.97 | | | |
| 0 | CH₃ | —CO—CH₂—CH(CH₃)CH₃ | H | C₁₄H₂₅NO | 223 | 75.33 | 11.21 | 6.28 | | 75.30 | 11.28 | 6.48 | | 131 | 0.17 |
| 2 | CH₃ | H | —CH(CH₃)CH₃ | C₁₄H₂₇N | 269 | 80.38 | 12.91 | 6.70 | | 80.60 | 12.80 | 6.85 | | 72 | 1 |
| (*) 2 | CH₃ | —CO—CH₂—CH₂—CO—CH₃ | H | C₁₉H₃₃NO₂ | 307 | 74.26 | 10.75 | 4.58 | | 74.31 | 10.85 | 4.70 | | 145 | 0.12 |
| 1 | CH₃ | H | H | C₁₀H₁₉N | 153 | 78.43 | 12.42 | 9.15 | | 78.55 | 12.35 | 9.25 | | 43 | 1 |
| (*) 1 | CH₃ | —CO—CH₂—CH₂—CO—CH₃ | H | C₁₅H₂₅NO₂ | 251 | 71.71 | 9.96 | 5.58 | | 71.64 | 10.10 | 5.75 | | 140 | 0.19 |

The pharmacological research on the indicated products was performed on mice, rats, rabbits, cats and dogs, both "in vivo" and on isolated and perfused organs "in vitro."

We performed: researches on the motor activity (acetography), analgesia (according to D'Amour and Smith), conditioned reflexes (pole climbing test), respiratory function (spirometry), bronchospasm from histamine, cardiocirculatory function (recording of arterial pressure and electrocardiogram), local anesthetic activity, experimental hyperpyremia, intestinal transition, "in vitro" response of the intestine and uterus to ACH, Hi, 5HT, BaCl₂, morphologic hematochemical blood picture, protective activity with respect to experimental gastric ulcer caused by ligature of the pylorus and immobilisation.

A particular care was given to the ascertainment of the toxicity and the influences exerted upon behavior.

The sedative and analgesic activity of the products, performed on mice and rats respectively, were evaluated quantitatively using the Eddy method, by assessing for each dosage level the percentage of animals with a decrement of the number of movements (for 60 minutes) and with an increment of the reaction times to pain (in 60 minutes) exceeding $\overline{X} \pm 2SD$ ($\overline{X}$=mean, SD=standard deviation), calculated in the controls of the same sex and weight treated with "placebo."

With these percentages were plotted the dose-effect curves and the corresponding $ED_{50}$ computed. The toxicity was deduced from the $LD_{50}$ of the products examined, calculated according to Wilcoxon and Lichtfield. The action upon the conditioned reflexes was deduced from the percentage of the inhibition responses and from the comparison, with respect to the controls, of the mean latent time between the application of the conditioning stimulus and the conditioned reaction. The differences were analyzed using the Student test.

The effect on local anesthesia has been tested in the surface anesthesia in comparison with procaine and lidocaine using the Frey test.

With the described data the intensity-duration curves of the local anesthesia effect were plotted.

The effect on the intestinal transition (following Macht) and the effect on experimental hyperthermia (following Burn) were examined in mice and in rabbits, respectively, in comparison with the controls. The differences of the observed values with respect to the controls were analyzed with the Student test.

The responses of the uterus and intestine to ACH, Hi, 5HT and BaCl$_2$ were quantitatively examined following Burn's suggestions.

The observations on chronic toxicity for the various apparatus were carried out on rats by means of the growth examination, hematochemical and analytical examinations of the urines, diuresis tests on water diuresis and histomorphological examinations. The possibility of a teratogenous action of the compounds under investigation was tested by administering the compounds concomitantly with the mating, both to the males and females, and continuing the administration for the successive 21 days. Investigations on behavior and tests on subacute toxicity were conducted for 30 days in adult dogs of both sexes. In the latter was also tested the course of glykemia, azotemia, blood coagulation, erythrocyte sedimentation, hemocytometry and electrocardiogram. Behavior tests were performed on cats and on mice (fighting behavior tests).

The antiulcerative activity following the ligature of the pylorus and immobilization was investigated in rats for two daily dosage levels. This activity was assessed on the basis of the percentage of the animals free from gastric ulcers, as compared with the incidence of ulcers in the controls, on the basis of the pH measurements of the gastric juice and qualitatively with reference to the number and sizes of the ulcers present.

Altogether the products marked with an asterisk in Table 1 present the following pharmacological properties:

(1) A sedative and analgesic action without impairment of muscular efficiency and of the conditioned defensive reflexes.
(2) A spasmolytic action characterized by anticholinergic, antihistaminic and antiserotoninic components.
(3) A protective action on experimental ulcers caused by ligature of the pylorus and by immobilization.
(4) A local anesthetic, cicatrizing and antimicrobic action.
(5) An antipyretic action.

The above compounds appear to be free from harmful collateral effects on the cardiocirculatory and respiratory apparatus, on blood, on reproduction and progeny. The range of tolerance computed with regard to the sedative action varies from 1:30 to 1:20, according to the term considered. The tolerability with respect to chronic administration is very high. The acetamide of 1-4-endomethylen-2-oxyethyl - aminomethyl-3-phenylcyclohexane manifests a psychostimulating activity in the various laboratory species. In Table 2 we give a partial picture of the pharmacological actions capable of a therapeutical application exhibited by the products marked with an asterisk in Table 1.

On the basis of the pharmacological tests the present series of products suggests the possibility of highly interesting therapeutical uses in the field of psychoneuroses and in the sectors of gastroenteric and cardiocirculatory pathology caused by psychosomatic etiopathogenesis.

TABLE 2.—PHARMACOLOGICAL DATA

| Effect | Formula | | | |
|---|---|---|---|---|
| | 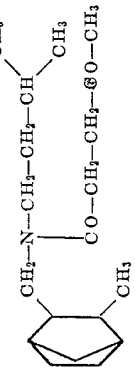 | 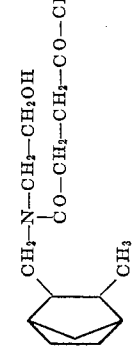 | 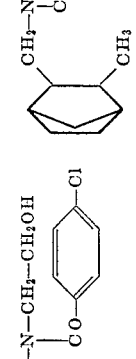 | 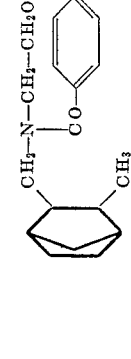 |
| LD$_{50}$, mg./kg. (per os) | 4,500 | 3,000 | | 2,500 |
| ED$_{50}$ sedative, mg./kg. (per os) | 180 | 250 | | 60 |
| 50% inhibition of the intestinal spasm (in g./ml. of perfusion liquid) by— | | | | |
| Acetylcholine (5·10⁻⁵) | 1·10⁻⁵ | 4·10⁻⁵ | | 8·10⁻⁶ |
| Histamine (1·10⁻⁷) | 7·10⁻⁵ | 1-5·10⁻⁶ | | 1·10⁻⁶ |
| Barium chloride (5·10⁻⁵) | 5·10⁻⁶ | 1·10⁻⁶ | | 1·10⁻⁶ |
| 5-hydroxytryptamine (6·10⁻⁶) | 1·10⁻⁶ | 20·10⁻⁶ | | 1·10⁻⁵ |
| Local anesthetical action (active concentration in g. percent for 60 min.) | | | | |
| Gastric ulcer prevention 50% protective dose in mg./kg. s.c.: | | | | |
| (a) Ulcer by pylorus ligature (Shay) | 120 (in 24 h.) | 240 (in 24 h.) | | 350 (in 24 h.) |
| (b) Ulcer by immobilization | 240 (in 24 h.) | 240 (in 24 h.) | | 240 (in 24 h.) |

What we claim is:

1. The compound para-chlorobenzamide of 1-4 endomethylene - 2 - oxyethylaminomethyl - 3 - methylcyclohexane, having the formula:

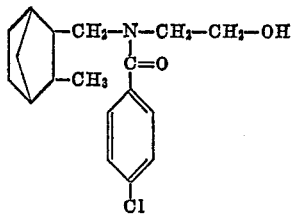

2. The compound levulinamide of 1-4 endomethylene-2-oxyethylaminomethyl-3-methylcyclohexane, having the formula:

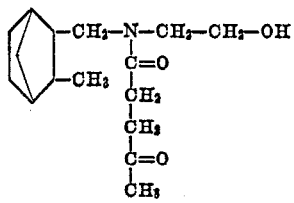

3. The compound acetamide of 1-4 endomethylene-2-oxyethylaminomethyl-3-phenylcyclohexane, having the formula:

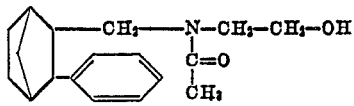

4. The compound mono-isovaleramide of 1-4 endomethylene - 2 - aminomethyl - 3 - methylcyclohexane, having the formula:

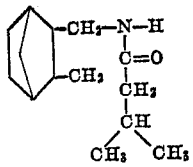

5. The compound levulinamide of 2-isoamylaminothyl-3-methyl-1,4-endomethylenecyclohexane, having the formula:

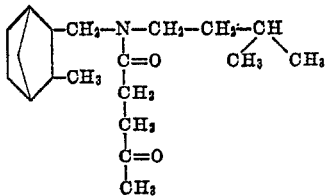

6. The compound levulinamide of 1-4 endomethylene-2-methylaminomethyl-3-methylcyclohexane, having the formula:

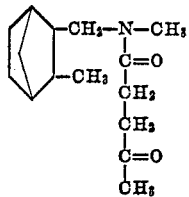

References Cited

UNITED STATES PATENTS 3,052,039   9/1962   Morales et al. _____ 260—561
2,736,746   2/1956   Goldberg et al. _____ 260—561

HARRY I. MOATZ, Primary Examiner

U.S. Cl. X.R.

260, 561, 562, 563, 570.5; 424, 320, 324